May 28, 1968 KIYOSHI INOUE 3,385,947

APPARATUS FOR COMBINED ELECTRICAL DISCHARGE MACHINING AND ELECTROMECHEMICAL MACHINING

Filed Nov. 12, 1963 4 Sheets-Sheet 1

KIYOSHI INOUE
*INVENTOR.*

BY Karl F. Ross

AGENT

KIYOSHI INOUE
*INVENTOR.*

BY Karl G. Ross
AGENT

KIYOSHI INOUE
*INVENTOR.*

BY

Karl F. Ross
AGENT

INVENTOR.
KIYOSHI INOUE
BY
Karl G. Ross
AGENT

United States Patent Office 3,385,947

Patented May 28, 1968

3,385,947
APPARATUS FOR COMBINED ELECTRICAL DISCHARGE MACHINING AND ELECTRO-CHEMICAL MACHINING

Kiyoshi Inoue, Kanagawa, Japan (183 3-chome, Tamagawayoga-machi, Setagaya-ku, Tokyo, Japan)

Filed Nov. 12, 1963, Ser. No. 323,042
Claims priority, application Japan, Nov. 13, 1962, 37/49,784; Feb. 21, 1963, 38/9,028; Apr. 12, 1963, 38/27,019; May 7, 1963, 38/23,448; Aug. 5, 1963, 38/41,656
14 Claims. (Cl. 219—69)

ABSTRACT OF THE DISCLOSURE

Apparatus for combined electrical discharge machining and electrochemical machining having a selective coolant system for combining and separating of coolants of different electrical conductivity.

The electrode employed may have different-diameter axially displaced portions for sequential use with different coolants, and may be insulation-coated in parts to insulate such parts from electrolytic coolants.

My present invention relates to a method of machining conductive bodies and, more particularly, to the electrical removal of material from conductive bodies to impart thereto any desired configuration. This invention is an extension of the principles disclosed in my U.S. Patent No. 3,223,603, issued Dec. 14, 1965; in my copending application Ser. No. 316,955, filed Oct. 17, 1963; and in my U.S. Patent No. 3,317,773, issued May 2, 1967.

As disclosed in the above-mentioned patents and copending application, the electrical erosion through electrolytic or spark-discharge machining methods is a superior technique for imparting any desired configuration to electrically conductive bodies and is capable of high machining precision and material-removal rates. In my Patent No. 3,223,603 mentioned above, I disclose improvements in the field of metal erosion derived from a combination of electrical discharge and electrolytic action. In the spark-discharge process, an impulsive electrical discharge is established between a machining electrode and the conductive workpiece, which constitutes the counter-electrode, usually in a dielectric liquid, to melt portions of the workpiece thus eroded and suspend them in the dielectric. In the electrolytic technique, a substantially continuous direct current was applied between the workpiece, constituted as an electrode, and the tool to dissolve part of the workpiece material in the electrolyte by an ionization process. The latter application is drawn to a method of achieving an optimum machining rate simultaneously with a fine finish by combining electrolytic and impulsive-discharge erosion. Thus, it was an important feature of this earlier technique to combine in a single apparatus means for applying an impulsive current for the rough machining of the body and for supplying the direct current desirable for the finishing steps. In the present apparatus a combined power supply is provided which eliminates the necessity of rectifier devices to prevent reverse current flow in the discharge circuit caused by negative impulses which would otherwise be present.

In my Patent No. 3,317,773 I describe a particularly effective electrode material for discharge machining, this material enabling a maximum erosion of the workpiece material with respect to the rate of erosion of the forming electrode.

Finally, in my application Ser. No. 316,955, I disclose and claim an ion-control system for monitoring and regulating an electrochemical machining process.

It is the principal object of the present invention to extend the principles described in these earlier applications and my related U.S. Patents Nos. 2,924,751 and 3,054,931 to a system capable of achieving exceptionally high surface finishes and machining rates.

A further object of this invention is to provide a method of and an apparatus for the electrical machining of conductive bodies so as to achieve surface finishes of greater precision than those possible heretofore.

These objects, and others which will become apparent hereinafter, are attained in accordance with the present invention by providing a machining technique which can be termed an electrochemical-discharge machining process wherein, under certain specific conditions, an electrochemical erosion of a workpiece is followed by an impulsive-discharge finishing step. The improved results attainable by a system of this type apparently derive from the fact that electrochemical or electrolytic erosion of a conductive workpiece can be carried out at high rates with accuracies on the order of tenths of a millimeter whereas electrical-discharge machining, while operable at substantially lower machining rates, is capable of accuracies on the order of hundredths of a millimeter. It is an essential feature of the present invention that the machining method comprise the steps of electrolytically eroding portions of the workpiece by constituting the latter as a first electrode, spacedly juxtaposing it with a second electrode and passing a unidirectional or substantially unidirectional current between the electrodes while immersing them in a conductive liquid (i.e., an electrolyte); this rough forming, which results in material removal at a high rate, is then followed by an impulsive-discharge machining process for which purpose the electrolyte is replaced by a substantially nonconductive liquid (e.g., an organic liquid dielectric) and an impulsive current is passed between the workpiece and the tool electrode to effect a spark discharge therebetween. For the purposes of the present invention, it is an essential feature that the same electrode body consitute the tool for the electrolytic erosion of the workpiece and for the impulsive finishing thereof. The use of a single electrode body without altering the relative positions of workpiece and electrode during interchange of function (i.e., to replace the electrolyte liquid with the dielectric liquid and connect an impulsive power means across the electrode and workpiece in place of a direct current power means) permits machining accuracies on the order of those possible with the most precise machine tools presently available.

According to another feature of this invention, the electrode body has a first portion adapted to effect electrolytic erosion of a workpiece surface and a second portion, spaced from the first portion away from this surface in a direction transverse thereto, for carrying out the spark-discharge finishing of the workpiece, means being provided for advancing the electrode toward the workpiece surface in the aforementioned direction. I have discovered that excellent results can be obtained when, during the electrolytic-machining stage (i.e., electrochemical machining) the electrode is fed continuously in a direction perpendicular to the surface in a workpiece-piercing sense so that the first portion of the electrode or tool constitutes a guide for the second portion which effects the impulsive finishing. Moreover, the piercing operation can constitute the main material-removal stage of the process and can be followed by a displacement of the electrode and workpiece relative to each other during the impulsive-finishing stage (electrical-discharge machining) in a direction transverse to the direction of movement of the electrode during electrochemical processing. Thus, when the first portion of the electrode forms a cavity in the workpiece surface by linear displacement transverse thereto, the relative motion of the workpiece and the second portion of the electrode during the succeeding stage of the process results in an enlargement of this cavity to the desired final dimensions with a precision on the order of hundredths of a millimeter as indicated above. I have further found that the most effective relative movement of the electrode and the workpiece during the spark-discharge stage is in an annular path so that the periphery of the second electrode portion progressively sweeps the periphery of the cavity while maintaining the spark-discharge gap.

Still another feature of this invention resides in the offsetting of the first and second portions of the electrode, which are designed to electrically erode the workpiece successively, and providing an intervening part of the electrode which has a substantially nonconductive periphery to prevent undesirable current flow during interchange of functions but which facilitates piercing of the workpiece. Thus, the tool electrode can be provided with a nonconductive sheath intermediate the two working portions of the electrode which, of course, can be of different materials if desired. In this connection I have found that the electrolytic-machining electrode material should constitute a material of the type described in my Patent No. 3,317,773. Basically, materials of this type include a metallic body containing at least one electronegative substance capable of generating negative ions in the region of the spark discharge for limiting erosion of the electrode by positive ions produced by the discharge, the electronegative substance being selected from the Groups IV–VII of the Mendeleeff Periodic Table and being uniformly distributed throughout at least the surface regions of the electrode. Preferably, the electrode portion is composed of a metal and the electronegative substance is present in an amount between 1% and 10% by weight of the metal and is a substance selected from the following group: copper oxide, tin oxide, iron oxide, manganese dioxide, aluminum oxide, iron carbide, copper sulphide, iron sulphide, molybdenum carbide, chromium oxide and tungsten oxide, in solid solution, best results being obtained with a copper electrode having uniformly dispersed therein 3.2% by weight of $Cu_2O$ to form the solid solution. The electrochemical-machining portion of the electrode may be composed of copper or brass or a silver/tungsten alloy.

As previously indicated, the present invention requires a liquid having electrolyte character during its initial stages, this electrolye liquid being replaced subsequently by a substantially nonconductive or dielelectric liquid. Corresponding to another aspect of this invention, the circulating liquid streams are sensed by means responsive to the difference in the conductivity of the liquids passing the sensing means for directing the liquids of different conductivities along predetermined and, advantageously, different processing or circulating paths. Thus, in accordance with this aspect of the invention, the sensing means may be provided along an outlet conduit through which the liquids leave the vessel and co-operates with valve means for selectively diverting the liquids of different conductivities to respective receptacles or reservoirs from which they can be recirculated to the vicinity of the electrode gap. It is also contemplated, in accordance with the present invention, to employ mixtures of dielectric and electrolyte liquids for the instant method; the vessel may, for example, contain both aqueous electrolyte and organic dielectric, the latter having a lower specific gravity than the former so that a well-defined interface is provided between the liquids. During electrolytic or electrochemical processing, there is a tendency for the electrolyte to splatter, this tendency being eliminated in its entirety by provision of a curtain of the dielectric liquid above the electrolyte. Furthermore, it is frequently desirable to employ emulsions for the electrical machining processes described above. Thus, during electrochemical machining, an oil-in-water-type emulsion of an organic dielectric (e.g., kerosene) in an aqueous electrolyte (saturated sodium-chloride solution) can be provided whereas, during electrical-discharge machining, a water-in-oil type of an emulsion can be provided, the latter having limited quantities of electrolyte dispersed in the organic dielectric. When emulsions of this character are employed it has been found desirable to separate, as much as possible, conductive liquids from primarily nonconductive liquids. These liquids may derive from independent circulation of electrolyte and dielectric liquids, from separation of one or the other liquid from an emulsion of the character described above or from separate circulations of emulsions of the two different types during the machining process. For this purpose, a sensing means, which can be directly responsive to the electrical conductivity of the liquids or indirectly responsive thereto, is provided along the discharge conduit and co-operates with valve means for selectively diverting the different liquids into respective receptacles. The indirect sensing means can include an electromagnetic coil through which the liquids pass and in which a reaction is developed in proportion to the conductivity of the liquid passing axially therethrough. The direct sensing means may include a pair of contacts immersed in the liquid in the manner of a conventional inflow conductivity cell. It may be further pointed out that similar means can be used to determine which of the liquids will be fed to the vessel in accordance with their respective conductivity and to effect proper admixture of electrolyte and dielectric to produce the emulsion.

Yet a further aspect of the present invention resides in the provision of an apparatus for the electrical machining of a workpiece wherein a single electrode body having the two electrode portions described above is juxtaposable with the workpiece; the apparatus further includes first and second power means for successively applying a relatively low-voltage, substantially unidirectional current and a relatively high-voltage impulsive current to the electrode and workpiece associated with means for deactivating the first power means and connecting the second power means in a discharge conduit across the electrode and workpiece while substantially concurrently terminating the circulation of electrolyte liquid and commencing the circulation of a dielectric liquid.

The above and other objects, features and advantages of the invention will become more fully apparent from the following detailed description, reference being made to the accompanying drawing in which:

FIG. 2 is a plan view, partly in cross-section, of the workpiece, showing the cavity formed thereon;

FIG. 3 is a diagram of the electrode movements during the electrical-discharge machining stage in accordance with one feature of this invention;

FIG. 4 is a view similar to FIG. 3 of another mode of relative displacement of the electrode and the workpiece;

FIG. 5 is a view similar to FIG. 2 illustrating a modification of this invention;

Figure 1:
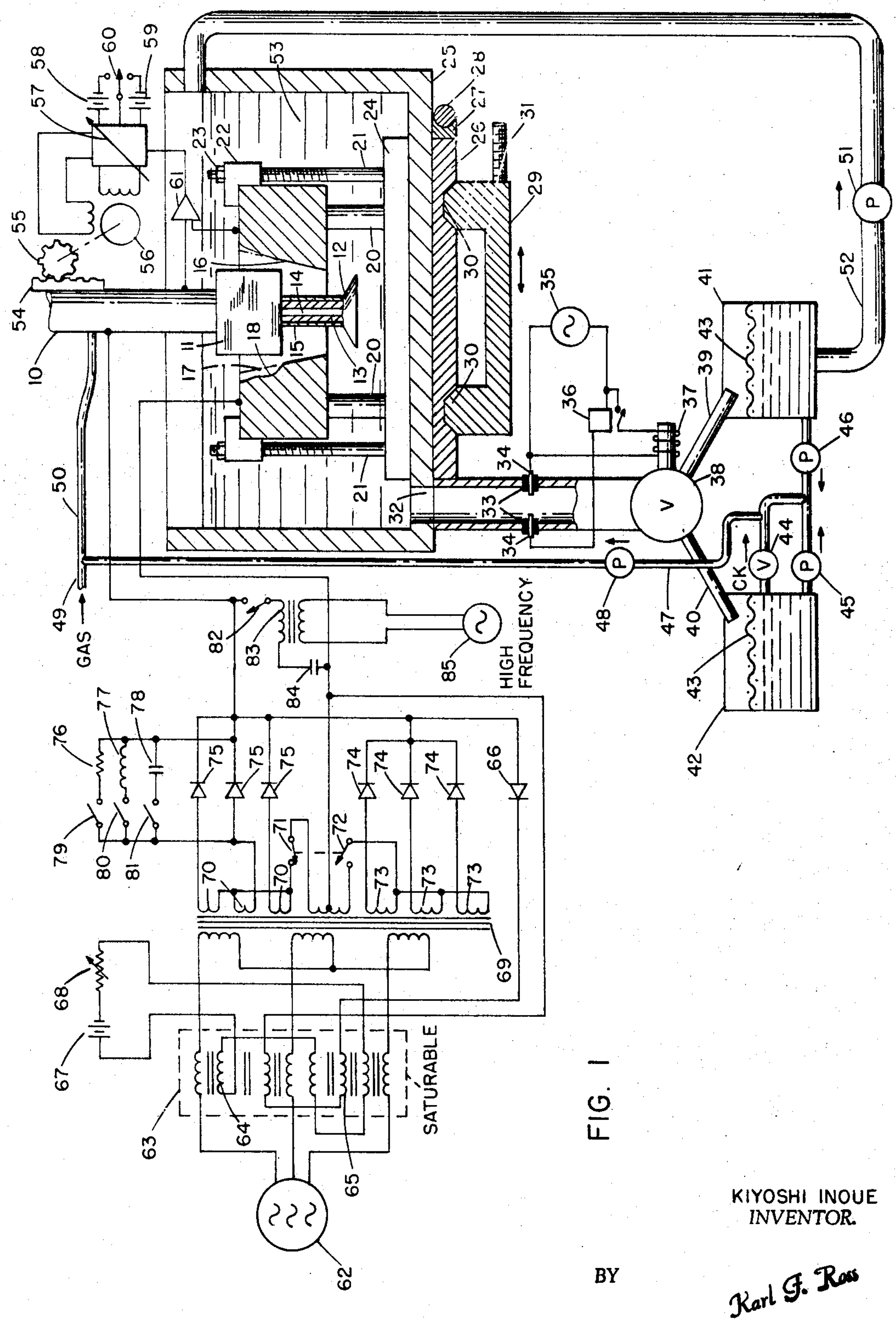
FIG. 1 is a cross-sectional view diagrammatically illustrating an apparatus for the electrochemical-discharge machining of a workpiece showing the circuit diagrams of power means therefor and means for circulating the electrolyte and dielectric liquids.

In FIG. 1 I show an electrode body 10 having a first portion 12 for electrochemically roughing out a workpiece 19 to produce the cavity illustrated at 17 (dot-dash lines) and a second portion 11 for the spark-discharge finishing step which produces the cavity indicated at 18. The remaining wall 16 of the cavity will be machined in the course of the spark-discharge stage. The electrode 10 has a central bore 14 by means of which electrolyte is supplied between the electrochemical-machining portion 12 and the workpiece 19 through the first stage of operation, the portions 11 and 12 being offset in the direction of electrode feed and separated by an intervening portion 13 having a sheath 15 of nonconductive material (i.e., melamine resin) on its surface. The workpiece 19 is carried by a plurality of uprights 20 extending from the support plate 24 and is held against these uprights by a plurality of L-shaped clamps 22 overlying the edges of the workpiece 19 and tightened thereagainst by nuts 23. The nuts are threaded onto bolts 21 rigid with the plate 24. This assembly is disposed within a vessel 25 which retains the liquid 53, the vessel being mounted upon a cross-slide 26 for displacement by the leadscrew 28 which engages a half-nut 27 mounted upon the cross-slide. The latter is carried by the V-ways of a longitudinal carriage 29 which is displaceable in the usual machine-tool sense by another leadscrew 31. Leadscrews 28 and 31 thus constitute a means for displacing the workpiece 17 relatively to the electrode 10 in a direction transverse to the feed thereof and advantageously in an annular path as will be described hereinafter.

The outlet tube 32 from vessel 25 has positioned therein a pair of electrodes 34 in insulating sleeves 33, these electrodes constituting a conductivity-sensing means positioned in the path of the liquid discharged from vessel 25. The conductivity electrodes 34 are connected in circuit with an electrical source 35 and a relay 36 whose contacts are adapted to energize the armature 37 of an electromagnetically operable two-position valve 38. In the open condition of relay 36, valve 38 shunts a dielectric or substantially nonconductive liquid along conduit 39 into reservoir 41 via a filtering screen 43 which removes eroded particles of the workpiece or electrode from the liquid accumulated in the reservoir. When a liquid of substantial conductivity is detected by electrodes 34, relay 36 closes to energize valve 38 and divert the liquid through conduit 40 into an electrolyte reservoir 42, via another screen 43 for removing the metallic particles. During electrochemical machining, a pump 48 draws electrolyte from reservoir 42 via check valve 44 and supplies it to a flexible conduct 50 which feeds this electrolyte to the electrode bore 14 and thus to the working gap. A gas can be admixed with the electrolyte via inlet 49 to prevent the formation of nonuniform current paths during electrolytic machining. When it is desired to use an oil-in-water emulsion, for example, metering pumps 45 and 46 are energized to supply predetermined quantities of the electrolyte and dielectric, respectively, to the common conduit 47 in which the liquid is emulsified by pump 48 and supplied to the vessel 25. When an oil-in-water emulsion is desired, pump 45 will, of course, have a greater throughput than pump 46 while the opposite will be the case when a water-in-oil emulsion is desired. A nonionic surfactant or emulsifying agent, such as nonylphenyl ether of polyethylene glycol, may be added to the liquid in an amount of about 1% to stablize the emulsion. When it is desired to effect electrical-discharge finishing of the workpiece, pump 51 circulates dielectric from reservoir 41 to the vessel 25 via tube 52 at a high rate.

The electrode 10 is, according to the instant invention, provided with means for advancing it in the direction of the machined workpiece surface to effect the piercing action by the electrode during electrochemical processing and a progressive displacement of the discharge machining portion of the electrode into the workpiece cavity when this is desired. These means preferably include a servo-mechanism diagrammatically illustrated as a servomotor 56 which drives a pinion gear 55 in mesh with a rack 54 affixed to the electrode 10. The servomotor 56 is operated by a servocontrol system 57 in accordance with the reference potentials provided by batteries 58 and 59 which are selectively connectable to the control system via a two-position switch 60.

When the low-voltage reference 59 is connected to the control system, the servomotor 56 maintains proper electrode feed for the electrochemical-machining operation whereas high-voltage reference 58 is connected in circuit during the spark-discharge finishing step. A servoamplifier 61 is energized in accordance with the potential across the electrode 10 and workpiece 19 to provide the necessary feedback.

The apparatus is energized by respective power-supply means for effecting electrochemical and spark-discharge machining. Both power-supply means have a common three-phase-current source 62 which feeds three windings of a three-phase saturable-core reactor 63 in series with the primary windings of a power transformer 69. The low-voltage secondary windings 70 of this transformer are connected in series with respective rectifiers 75, a switch 72' and half of a center-tapped secondary winding 71 of the transformer across the electrode and workpiece 10. When switch 72' is closed, therefore, a low-voltage pulsating direct current is applied across the machining gap to effect electrolytic erosion of the workpiece. The impedances 76, 77 and 78 can be connected selectively in parallel with one of these rectifiers 75 by switches 79, 80 or 81 to reverse periodically the substantially unidirectional current applied between the electrode and workpiece during the electrochemical-machining operation. In my copending application Ser. No. 316,955, now Patent No. 3,357,912 I point out that one of the drawbacks of electrochemical erosion of a workpiece is the tendency toward ionic contamination at the juxtaposed surfaces which gives rise to nonhomogeneous current flows and results in excessive erosion in one area and reduced erosion in another. As this application emphasizes, I have found that it is possible to markedly reduce the ionic contamination at the electrode and workpiece surfaces by periodically reducing the essentially unidirectional current to a substantial extent or, in an extreme, by periodically reversing it so that a wave of, for example, the type illustrated in FIG. 3 of this copending application is supplied across the workpiece and electrode. Thus, the amplitude of the essentially unidirectional current is reduced periodically for an interval which can be short relatively to the duration of the unidirectional flow by the use of an ohmic, inductive or capacitive impedance across one of the rectifiers supplying pulsating direct current to the electrodes. This apparently results in a partial dispersion of ions accumulated on the electrode surfaces and in the region thereof; this technique, moreover, permits the machining of substances like tungsten carbide containing electronegative constituents such as carbon. As it appears, the reversal of current flow results in a migration of hydrogen ions to the normally positive workpiece and a reaction at the latter with carbon along exposed portions of the tungsten-carbide body. The reversed polarity of the workpiece is only temporary so that upon re-establishment of the original electrolytic-machining conditions, the workpiece is again prepared for erosion of tungsten.

The power means for the electrical-discharge finishing process includes a plurality of high-voltage secondary windings 73 of transformer 69 which are connected across the electrode and the workpiece via rectifiers 74, a switch 72 and the other half of the center-tapped secondary winding 71 of the transformer. Switches 72 and 72' are ganged for joint operation to effect switchover from the electrochemical-machining stage to the spark-discharge machining process. A high-frequency alternating-current source 85 is connected via a transformer 83 in series with a D-C blocking condenser 84 and a switch 82 across the electrode and workpiece for applying a high-frequency alternating current thereacross; I have found that the use of an auxiliary high-frequency alternating-current source during electrolytic machining results apparently in a reduction of the work function at the electrode and/or workpiece surfaces and in a consequent increase in the machining rates and the field necessary to overcome this work function. There is, moreover, a disruption of the magnetic field produced by the unidirectional current in the region of the machining gap and, consequently, a reduction in the tendency of ions to concentrate at a particular region of this gap. The saturable-core reactor 63 has biasing windings 64 connected in series with the battery 67 and a potentiometer 68 which is employed to set the power to be supplied to the electrode and workpiece during both stages of the processing. A control winding 65 in series with rectifier 66 of this reactor is connected across the workpiece 19 and the electrode 10 to provide a feedback control of the power supplied in the manner described in my aforementioned applications.

As will be evident from FIG. 2, after initial penetration of the workpiece 19 by the electrochemical portion of electrode 10, the second portion 11 of the latter comes into play for the finishing of the cavity as indicated at 18. This finishing is effected by an initial radial displacement of the electrode relative to the workpiece and followed by an angular relative displacement to sweep the periphery of the cavity. This movement, which can be effected by the leadscrews 28 and 31, is illustrated diagrammatically in FIG. 3 wherein the arrows 89–93 represent successive positions of the electrode with respect to the workpiece 86 in machining a rectangular cavity 87.

FIG. 4 shows this method applied for the production of a generally circular cavity. In this case the electrode and the workpiece 94 are initially displaced relatively in the radial direction (arrow 96) and then in an annular path (arrows 97) to produce the cavity 95. The annular path can be produced by proper programming of the leadscrew servomotors. The discharge portion 101 (FIG. 5) of the electrode is, in this case, of circular configuration (see also FIGS. 6A–6D), and has a bore 102 for supplying electrolyte and/or dielectric liquid to the machining gap. By displacing the electrode 101 in the sense shown in FIG. 4, a parallel-wall cavity 99 can be produced efficiently and with a high degree of accuracy.

Figures 6A, 6B, 6C, 6D:
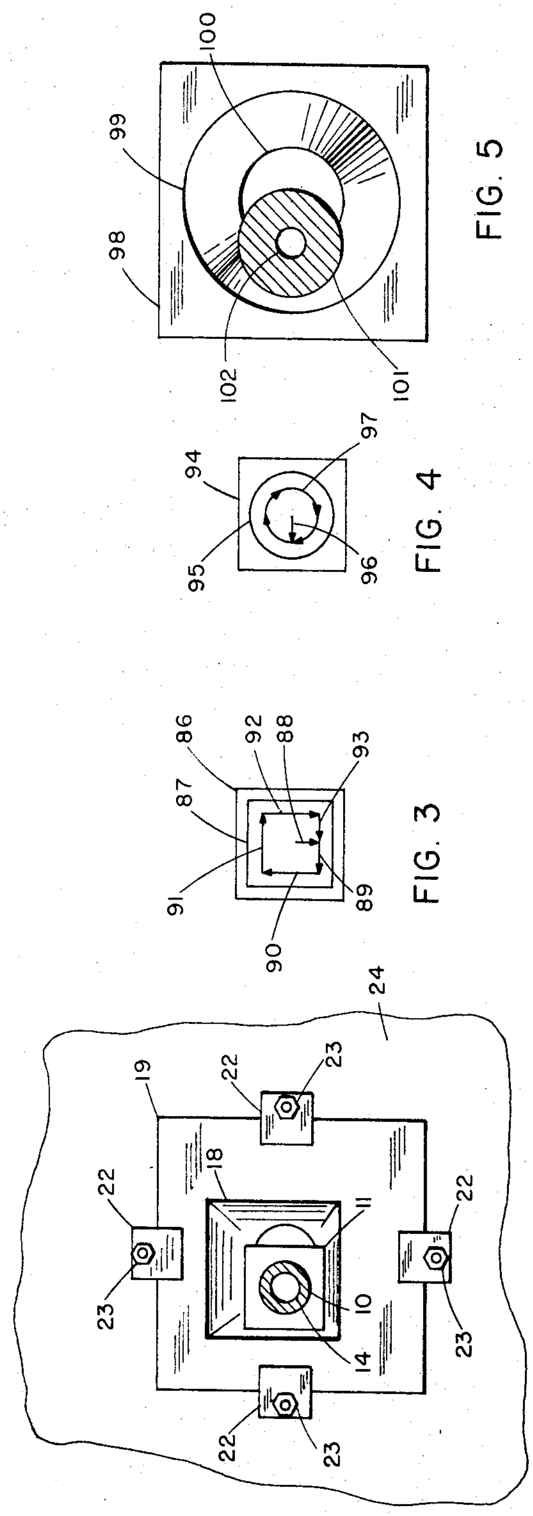
FIGS. 6A–6D are cross-sectional views through a workpiece illustrating successive steps in the production of a die in accordance with the invention.

In FIGS. 6A–6D I show the machining of a workpiece 103 using the two stages of electrolytic and spark-discharge machining successively, the electrode body 107 having a lower portion 109 for the electrochemical erosion of the workpiece and an upper portion 111 for the discharge machining thereof. The workpiece 103 is provided with a bore 106 in line with the cavity 104 initially formed in workpiece 103 to supply electrolyte to the gap between the workpiece and the electrode. The electrode is displaced during this first stage axially (arrow in FIG. 6A) and erodes the workpiece to produce a frustoconical cavity 105 and eventually pierce the workpiece (FIGS. 6B and 6C). During the latter stage, the lower portion 109 of the workpiece constitutes a guide means therefor, permitting the spark-discharge machining portion 111 to erode gradually the workpiece laterally of the electrode to produce the straight surface 110 and enlarge the cavity to its desired dimensions upon relative movement of workpiece and electrode in the direction of arrow 112.

Figure 7:
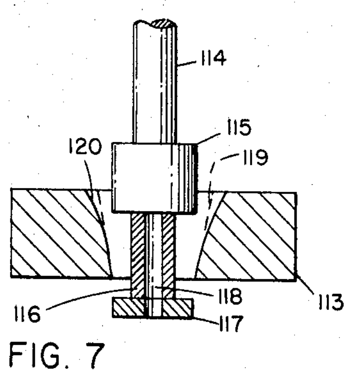
FIG. 7 is a cross-sectional view through a workpiece machined by a different type of electrode.

In FIG. 7 the workpiece 113 is shown to be electrochemically formed (dot-dash lines 119) to a slight undersize, but is then brought to its final dimension 120 by the electrical-discharge machining portion 115 of the electrode 114. As illustrated, this electrode comprises an electrochemical-machining part 117 having a bore 118 for the circulation of electrolyte and spaced from the discharge machining portion 115 by a section 116 of conductive material different from electrode portion 117. In contradistinction, the electrochemical-machining portion 12 of electrode 10 is integral with the intervening portion 13.

Figure 8:
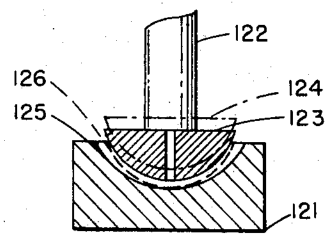
FIG. 8 is a view similar to FIG. 7, illustrating a further modification of an electrode structure.

FIG. 8 shows a modified electrode structure for producing upwardly concave cup-shaped recesses in a workpiece 121. The electrode 122 has a dome-shaped convex machining portion 123 whose lower part constitutes the electrolytic-machining portion when the electrode is in its dot-dash position 124 and whose upper part completes the roughed-out cavity (dotted lines 126) to provide the finished surface 125.

Figure 9:
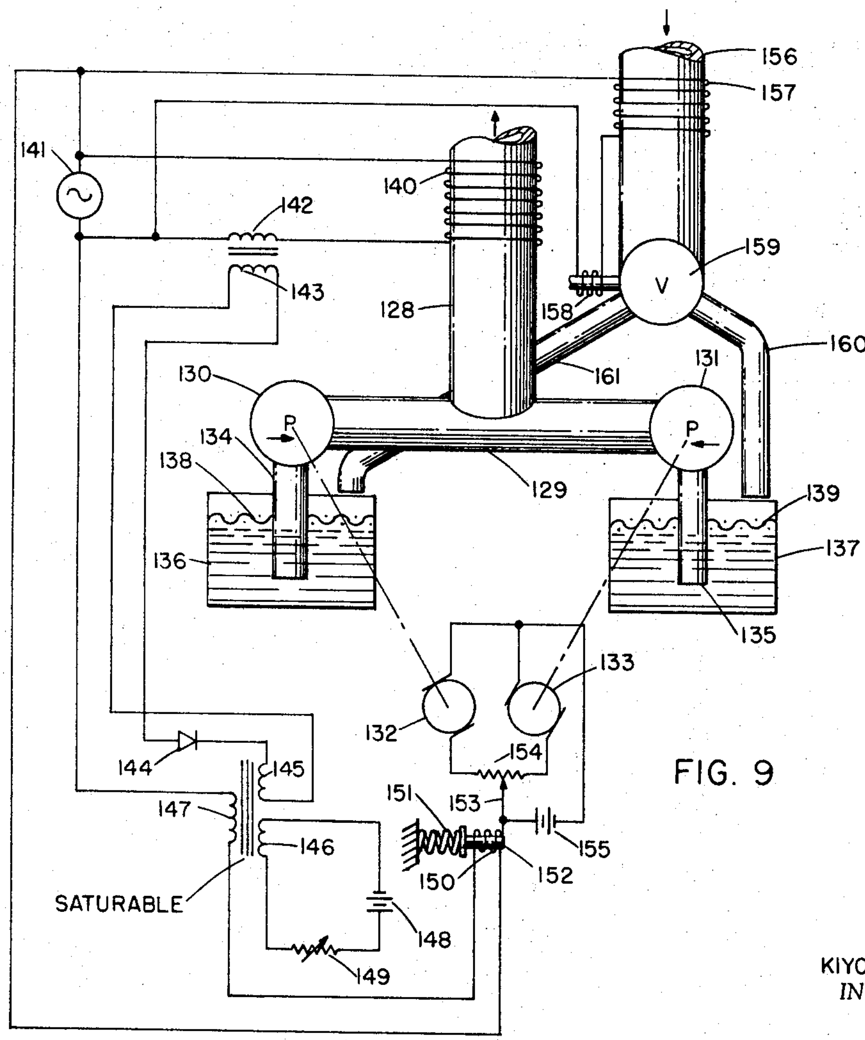
FIG. 9 is a diagram of a liquid-control system adapted to be substituted for the system illustrated in FIG. 1.

FIG. 9 shows a modified liquid-circulating system in accordance with the present invention. In this system, a drain conduit 156 is surrounded by an electromagnetic coil 157 which detects changes in the conductivity of the liquid passing therethrough and activates an electromagnetic valve 159 whose coil 158 is in series with the sensing coil 157 across the source of alternating current 141. Electrolyte thus flows via pipe 160 into the reservoir 137 via the filtering screen 139. When a highly conductive liquid is sensed by coil 157, valve 159 diverts this conductive liquid via tube 161 into reservoir 136 via filter screen 138. An emulsion or liquid of predetermined conductivity can be fed to the electrode system or to the vessel via a conduit 128 which is fed by a tube 129 from pumps 130 and 131, respectively drawing liquid through pipes 134 and 135 from reservoirs 136 and 137. Pumps 130 and 131 are driven by respective variable-speed motors 132 and 133 at rates in accordance with the position of a slider 153 of a potentiometer 154 which applies higher or lower voltages across the motors in accordance with this slider position. An electromagnetic sensing coil 140 surrounds conduit 128 and detects the conductivity of the liquid flowing therethrough to vary the current in the energizing circuit of this coil which is connected across alternating-current source 141. These current variations are sensed by a current transformer 142 and applied by the secondary winding 143 thereof and a rectifier 144 to the control winding of a saturable reactor 147 whose biasing winding 146 is connected in series with a battery 148 and a setting potentiometer 149. The power winding of saturable reactor 147 is connected in circuit with the a.c. source 141 and a solenoid coil 150 adapted to displace an armature 151 to which the slider 153 is affixed against the force of a spring 151.

When it is desired to circulate only a dielectric liquid to the electrode system, potentiometer 149 is set at such position that saturable-coil reactor 147 is nonconductive so that spring 151 urges the armature 152 to the right to apply the full voltage of battery 155 across pump motor 133 and circulate the dielectric liquid to the electrodes. When it is desired to circulate only electrolyte to the latter, potentiometer 149 is adjusted to its other extreme position, in which case reactor 147 is fully conductive to energize solenoid 150 and displace armature 152 to the left, thereby driving motor 132 and pump 130.

When a metering of electrolyte and dielectric is desired to produce an emulsion or liquid curtain of the character described, potentiometer 149 is set at an intermediate position to displace slide wire 153 to a point at which both motors 132 and 133 are driven at rates proportional to the rates at which the two liquids are to be fed to the electrode system.

Figure 10:
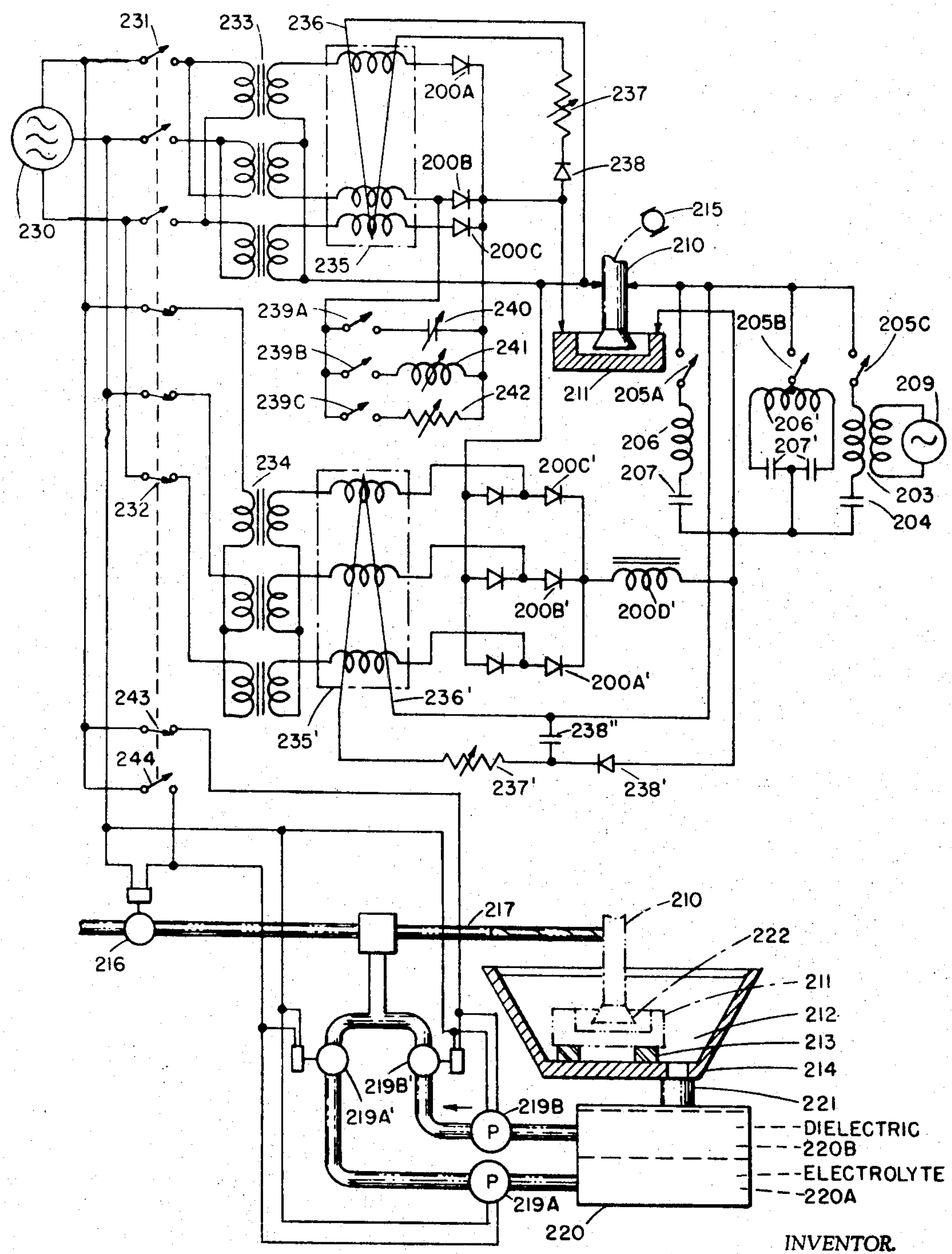
FIG. 10 is a view similar to FIG. 1 of an apparatus suitable for use in electrochemically machining a metallic workpiece and finishing it by spark discharge.

In the apparatus of FIG. 10 a three-phase alternating-current line source 230 feeds the ganged switches 231, 232 which supply current to respective three-phase isolation transformers 233, 234. Each of the secondary windings of transformer 233 is connected in series with the respective winding of a saturable-core transformer 235 whose control winding is shown at 236. A rectifier 238 and a variable resistor 237 are connected in series with control winding 236 across the electrode 210 and the workpiece 211, which are also shown in dot-dash lines within vessel 214 in that portion of FIG. 2 in which the electrolyte-circulation means is illustrated. The three outputs of saturable-core transformer 235 are connected in series with respective rectifiers **200*a*, 200*b*, 200*c* which convert the alternating current to pulsating direct current which is then supplied to the workpiece 211, forming the positive electrode of the system. The negative electrode 210 is returned to a bus bar common to the secondary windings of isolation transformer 233. Switches 239***a*, 239*b*, 239*c* are connected, respectively, in series with a variable capacitor 240, a variable inductance 241 and a variable resistor 242, constituting impedances which can be selectively bridged across rectifier means 200*b*.

The ganged switches 232, which are coupled with switches 231 so that the latter are opened when the former are closed, and vice versa, supply three-phase alternating current to the primary windings of isolation transformer 234. The secondary windings of the latter are connected in series with respective windings of a saturable-core reactor 135′ whose control winding 236′ is in series with a potentiometer 237′ and a rectifier 238′, a capacitor 238″ bridging this control winding and forming a differentiating circuit with variable resistor 237′. The three outputs of reactor 235′ supply respective rectifier bridges 200*a′*, 200*b′*, 200*c′* whose positive terminal is connected to the workpiece 211 and whose negative terminal is tied to electrode 210. The latter is provided with a motor 215 to maintain the spark gap at a predetermined magnitude.

A switch 205*a*, in series with an inductance 206 and a capacitance 207, serves to connect this resonant network across the electrode 210 and workpiece 211. Similarly, switch 205*b* is connected in series with the center tap of an inductance 206′ whose branches are in series with respective condensers 207′, thereby forming a parallel-resonant network. In addition, an external source of high-frequency alternating current 209 is inductively coupled to a series-resonant network 203 whose capacitor 204 is in series with the transformer secondary and a switch 205*a*.

Another pair of switches 243, 244 is coupled for simultaneous operation with switches 231 and 232. Switch 243 serves to energize an electromagnetic valve 219*b′* and a pump 219*b* associated therewith for circulating a dielectric liquid (e.g., kerosene) 220*b* from reservoir 220 through flexible tube 217, electrode 210, vessel 214 and outlet 221. The workpiece 211 is mounted upon insulating blocks 213 within this vessel. Similarly, switch 244 serves to actuate an electromagnetically controlled valve 216 by means of which an inert gas (e.g., nitrogen) is admixed with circulating electrolyte, a second electromagnetically controlled valve 219*a′*, and a pump 219*a*, by means of which aqueous electrolyte (e.g. a sodium-chloride solution) 220*a* is circulated from reservoir 220 through the electrode 210 and vessel 214.

During the primary stages of operation, switches 231 and 244 are closed while switches 232 and 243 are open. Under these circumstances, a unidirectional current of low voltage flows through the gap 222 between the electrode 210 and the workpiece 211. Rectifiers 200*a*–200*c* provide half-wave rectification of the three-phase current. When, however, one of the switches 239*a*–239*c* is closed, an impedance is bridged across the rectifier means 200*b* and the wave form of the current supplied to the electrodes is of the type shown in FIG. 3 of my copending application Ser. No. 316,955. This wave form has a reversal or negative portion of relatively short duration and magnitude intermediate two positive waves of longer duration. The positive pulse serves to machine the workpiece, which can be tungsten carbide, while the reversal or the remainder of the half-cycle results in a reversal of polarity to remove exposed carbon from the tungsten-carbide body. One or more of the switches 205*a*–205*c* may be closed to superimpose upon the direct-current pulses a high-frequency alternating current. Subsequently to the electrochemical machining of the workpiece 211, the latter can be finish-formed by spark-discharge.

In this case, switches 231 and 244 are opened and switches 232, 243 are closed. The direct current of rectifier bridges 200*a′*–200*c′* is then applied as a discharge via an impedance 200*d′* across the electrodes. While the closure of switch 244 for electrochemical machining causes circulation of electrolyte through the gap 222, operation of switch 243 results in the circulation of a dielectric liquid through this gap. The networks 237, 238 and 237′, 238′, 238″ are responsive to the potential across the gap and maintain the power supplied thereto substantially constant during both spark-discharge machining and electrochemical erosion. The dielectric and electrolyte liquids are separated within reservoir 220 as a consequence of their different specific gravities. The electrode 210, of course, may have the configurations of the electrodes illustrated in FIGS. 1 or 7.

EXAMPLE I

A punching die composed of SKD high-carbon hardened die steel (Rockwell hardness of 60) having a thickness of 25 mm., a width of 10 mm. and a length of 20 mm. is machined by conventional methods (i.e., milling machine and grinder) to a precision of 0.02 mm. and a roughness of 3$\mu$ (max.). This conventional machining process requires 8 hours and 40 minutes to completion.

Using an electrodischarge machining technique as described in U.S. patent application Ser. No. 281,365, and the apparatus illustrated herein it is possible to carry out the corresponding machining operation in 3 hours and 5 minutes with the discharge-machining network parameters given below. For this purpose, a copper electrode, containing 3.2% by weight of cuprous oxide in solid solution is juxtaposed with the workpiece constituted as another electrode while kerosene is circulated at a rate of about 1 liter/min. around the electrodes to constitute the dielectric liquid.

The identical punching die was produced by electrochemical-discharge machining of the hardened steel body, in accordance with the present invention, in a total time of 1 hour and 45 minutes. The body, which was also composed of SKD hardened die steel ($R_c$ 60), was initially subjected to an electrolytic erosion by a copper electrode juxtaposed therewith with a working gap of 0.05 mm. in a 5% aqueous sodium-chloride solution circulated at a rate of 10 liter/min. The unidirectional current had a current density of 40 amps/cm.$^2$ and a potential of 10 volts applied across the electrodes, there being superimposed thereon an alternating current (5 volts peak-to-peak) at a frequency of 10 kc./sec. to reduce the work function. The electrolyte was fed through the electrode at a pressure of 2.5 kg./cm.$^2$. Machining was carried out in this manner for three-quarters of an hour until the cavity of its largest portion was within 0.1 mm. of its final dimension. The electrolyte was then exchanged for kerosene liquid and the second portion of the electrode (composed of a 3.5% solid solution of cuprous oxide in copper) was then juxtaposed with the workpiece. Using the following electrodischarge machining parameters: a potential of 100 volts, a pulse duration of 0.7 $\mu$sec. and a repetition frequency of 20 kc./sec., spark-discharge erosion of the workpiece was effected for a period of one hour to produce a die accurate to within 0.02 mm. The electrochemical-discharge method produced a surface finish having a roughness of 3.5$\mu$ (max.). During the electrochemical-machining stage, the electrode was fed transversely to the workpiece surface while the electrodischarge stage made use of an eccentric movement of the electrode.

EXAMPLE II

The connecting rod for a 50-HP four-cylinder diesel engine, which required 7 hours and 40 minutes of forging time and 5 hours for electrodischarge machining, was produced with the parameters set forth in Example I in 2 hours and 40 minutes by the electrochemical-discharge method in accordance with the present invention. The forging technique resulted in a surface finish of 10$\mu$ (max.) roughness while electrodischarge methods gave a roughness of 12$\mu$ (max.) and the method of the present invention a surface roughness of 9$\mu$ (max.). In the latter process 1 hour was employed for the first stage while 1 hour and 40 minutes was required for the second stage. During the first stage of the process the electrolyte solution was replaced with an emulsion of 10% kerosene in the aqueous sodium-chloride soltuion (1% Tergitol NPX being added as an emulsifying agent). Tergitol NPX is a trade name for a nonionic emulsion stabilizer composed of the nonylphenyl ether of ethyleneglycol. At the close of the electrochemical stage, part of the electrolyte was drained from the vessel and replaced with kerosene to produce an emulsion consisting of about 10% aqueous sodium chloride in kerosene, the emulsifying agent again being present in an amount of about 1%. Similar results to those previously described were obtained.

EXAMPLE III

A plate having a 10 mm. layer of tungsten carbide along the underside of a 20 mm. layer of high-carbon steel was machined by an electrode body 10 whose lower or electrochemical-machining portion 12 was composed of copper. The upper or electrodischarge machining portion 11 of the electrode was composed of silver/tungsten alloy. A clean bore having a diameter of about 5 mm. was produced in 85 minutes, the first 25 minutes being required for the electrolytic erosion and the following 60 minutes being employed to rectify the bore. The resulting surface roughness was about 1$\mu$ (max.). The parameters indicated for the electrolytic stage in Example I were used, with the exception that a reversing current of about 10 amp/cm.$^2$ was permitted to flow periodically at short intervals during the electrolytic step in order to facilitate the erosion of the tungsten carbide. The electrodischarge portion of the process was carried out with the parameters for the spark-discharge step given in Example I.

What is claimed is:

1. In an apparatus for the electromachining of a conductive workpiece, in combination, electrode means spacedly juxtaposable with said workpiece across a machining gap; means for circulating two liquids having different conductivities into said gap; power means for passing an electric current between said electrode means and said workpiece; and separating means responsive to the electrical conductivity of the liquid circulated from said gap for directing it selectively along a predetermined path.

2. The combination defined in claim 1 wherein said separating means includes an electromagnetic coil responsive to variations in the electrical conductivity of substances passing axially therethrough, valve means controllable by said coil to divert said liquid along its separate path, and means for passing said liquid through said coil.

3. An apparatus for machining a conductive workpiece, comprising an electrode spacedly justaposable with a surface of said workpiece across a machining gap; a vessel surrounding said workpiece and said electrode; circulating means for selectively feeding an electrolyte liquid and a dielectric liquid to said vessel into said gap; first power means connectable to said electrode and said workpiece for passing a substantially unidirectional current therebetween; second power means connectable to said electrode and said workpiece for passing an impulsive current therebetween to effect a spark discharge between said electrode and said workpiece; means for deactivating said first power means and connecting said second power means to said electrode and said workpiece and substantially concurrently terminating the circulation of said electrolyte liquid and commencing the circulation of said dielectric liquid and means connected in said circulating means and responsive to the electrical conductivity of said circulated liquid for directing said liquid along a predetermined path.

4. An apparatus as defined in claim 3 wherein said electrode is provided with a first portion adapted to effect electrolytic erosion of said workpiece upon connection of said first power means across said electrode and said workpiece, and a second portion, offset in a direction transverse to said surface and away therefrom, adapted to effect spark-discharge erosion of said workpiece upon connection of said second power means across said electrode and said workpiece, said apparatus further comprising mechanism for advancing said electrode toward said workpiece in said direction.

5. An apparatus as defined in claim 4, further comprising means for displacing said electrode and said workpiece relatively over an annular path during connection of said second power means across said electrode and said workpiece.

6. An apparatus as defined in claim 4 wherein said electrode is surrounded with a nonconductive sheath intermediate said first and said second portions.

7. In an apparatus for the electromachining of an electrically conductive workpiece, in combination, electrode means juxtaposable with said workpiece with a machining gap therebetween, a source of electrolyte fluid, a source of dielectric fluid, means for mixing said fluids in a mixture of predetermined ratio and passing it under pressure through said gap, power supply means for providing an electrical current across said gap, means for removing said mixture from said gap, and means for separating and returning said fluids to their respective sources.

8. The combination as set forth in claim 7 wherein said mixture comprises an emulsion of aqueous electrolyte fluid suspended in an organic dielectric fluid.

9. The combination as set forth in claim 7 wherein said mixture comprises an emulsion of organic dielectric fluid suspended in an aqueous electrolyte fluid.

10. The combination as set forth in claim 7 wherein said separating means comprises a valve operating electromagnetic coil responsive to variations in electrical conductivity of said mixture.

11. Apparatus for electrochemically machining a conductive workpiece across a gap between said workpiece and a tool electrode comprising a first source of pressurized fluid electrolyte for providing electrolyte flow through said gap, a workpan for containing said electrolyte in a layer immersing said workpiece and electrode, a power supply connected across said gap, a source of pressurized fluid dielectric for providing a dielectric layer above said electrolyte layer for entraining particles removed from said workpiece, a return conduit means communicating with said workpan, a pair of conduits, each of said pair communicating between a different one of said sources and said return conduit means, and means operatively connected to said return conduit and responsive to the conductivity of said fluid passing therethrough for diverting it to one of said pair of conduits.

12. The combination as set forth in claim 11 wherein said last mentioned means includes an electromagnetic coil and a valve means operatively connected to and controlled by said coil for diverting said fluid to one of said pair of conduits.

13. The combination as set forth in claim 11 wherein said fluids have substantially different specific gravities and said first and second sources comprise a common receptacle for both the aforesaid fluids.

14. An apparatus for machining a conductive workpiece, comprising an electrode spacedly juxtaposable with a surface of said workpiece across a machining gap; a vessel surrounding said workpiece and said electrode; circulating means for selectively feeding an electrolyte liquid and a dielectric liquid to said vessel into said gap; first power means connectable to said electrode and said workpiece for passing a substantially unidirectional current therebetween; second power means connectable to said electrode and said workpiece for passing an impulsive current therebetween to effect a spark discharge between said electrode and said workpiece; and means for deactivating said first power means and connecting said second power means to said electrode and said workpiece and substantially concurrently terminating the circulation of said electrolyte liquid and commencing the circulation of said dielectric liquid, said electrode being provided with a first portion adapted to effect electrolytic erosion of said workpiece upon connection of said first power means across said electrode and said workpiece, and a second portion, offset in a direction transverse to said surface and away therefrom, adapted to effect spark-discharge erosion of said workpiece upon connection of said second power means across said electrode and workpiece, and apparatus further comprising mechanism for advancing said electrode toward said workpiece in said direction.

References Cited

UNITED STATES PATENTS

| | | | |
|---|---|---|---|
| 2,295,097 | 9/1942 | Waugh | 251—129 X |
| 2,526,423 | 10/1950 | Rudorff | 219—69 |
| 2,757,688 | 8/1956 | Klingler | 251—130 X |
| 2,773,968 | 12/1956 | Martellotti, et al. | 219—69 |
| 2,813,966 | 11/1957 | Matulaitis | 219—69 |
| 2,981,822 | 4/1961 | Larkins | 219—69 |
| 2,996,602 | 8/1961 | Webb | 219—69 |

RICHARD M. WOOD, *Primary Examiner.*

R. F. STAUBLY, *Assistant Examiner.*